April 28, 1970 J. M. N. KRIJNEN 3,509,553

RANDOM ACCESS STORAGE DEVICE UTILIZING FLEXIBLE MAGNETIC DISC RECORDS

Filed March 28, 1966 5 Sheets-Sheet 1

INVENTOR.
JOHANNES M. N. KRIJNEN
BY
Hugh A. Kirk
ATTORNEY

INVENTOR.
JOHANNES M. N. KRIJNEN
BY
ATTORNEY

INVENTOR.
JOHANNES M. N. KRIJNEN
BY
Hugh A. Kirk
ATTORNEY

INVENTOR.
JOHANNES M. N. KRIJNEN
BY Hugh A. Kirk
ATTORNEY

INVENTOR.
JOHANNES M. N. KRIJNEN
BY
Hugh A Kirk
ATTORNEY

United States Patent Office 3,509,553

Patented Apr. 28, 1970

3,509,553

RANDOM ACCESS STORAGE DEVICE UTILIZING FLEXIBLE MAGNETIC DISC RECORDS

Johannes M. N. Krijnen, Rijswijk, South Holland, Netherlands, assignor, by mesne assignments, to U.S. Philips Corporation, New York, N.Y., a corporation of Delaware Filed Mar. 28, 1966, Ser. No. 537,986
Claims priority, application Austria, Mar. 30, 1965, A 2,891/65; Apr. 5, 1965, A 3,077/65
Int. Cl. G11b 5/60, 17/22, 21/08
U.S. Cl. 340—174.1 4 Claims

ABSTRACT OF THE DISCLOSURE

Axially mounted, flexible recording discs are arranged so that the distance between any two discs is less than the thickness of the transducer. The flexibility of the discs enables the discs to adapt themselves to the position of the transducer thereby decreasing the need for precise positioning mechanisms.

This invention relates to a data storage device comprising a plurality of information storing discs rotatably mounted along a common axis and having at least one writing or recording and/or reading head mounted to be moved both axially and radially of said discs. These discs may be provided with a storage material which generally consists of magnetizable particles; which material may be covered with a non-magnetic coating.

Such data storage devices, normally called disc storages, are known in several forms. In these prior devices, the discs are co-axially mounted with an equal spacing distance between them that is so large that the recording and/or reading head can move freely between two discs without contacting either disc. Also the discs themselves are very rigidly constructed in order to warrant accurate positioning of the disc with respect to the recording and/or reading head. Thus, the construction and mounting of the discs has to be very stable and consequently rather heavy. The very accurate positioning of the recording and/or reading head with respect to the discs makes it necessary that the head is controlled with an extremely high accuracy in its axial movements with respect to the discs. Though it is possible to make the head self-adjusting with respect to the discs by using an air-cushioned or floating head, this only allows for a very restricted adjustment, so that the driving mechanism for the head and the mechanical construction of the head itself still have to be very accurate and consequently expensive.

A very important feature of disc storage devices is that they have a random access. This means that the recording and/or reading head from a first position in which it cooperates with a storage part of a disc, can be brought into cooperation with another storage part of another disc without having to move along all the information tracks present betwen these two desired storage parts, as would be the case in tape storage devices. Thus a short access time is of great importance; that is, a short average time is necessary for letting the head switch over from a first random position in which it can carry out writing and/or reading activities to another random position in which it cooperates with another part of the disc storage.

The average access time increases with the axial and radial dimensions of the region which has to be served by a single reading and/or recording head. On the other hand, the capacity of such a region increases with these dimensions, or the volume of the space increases which is taken up by such region of the storage device.

Accordingly, it is an object of this invention to provide a disc storage device having a large capacity in a relatively small volume.

Another object is to provide such a storage device with a relatively short access time in such a large capacity with a single recording and/or reading head of simple, light and inexpensive construction.

A further object is to provide such a storage device with very simple means to fix accurately the position of the recording and/or reading head with respect to a chosen disc.

The above objects are attained according to this invention by employing discs of flexible material which are mounted axially closer together than the greatest thickness of the recording and/or reading head, which head wedges itself between the flexible discs. Such flexibility of the discs enables them to adjust themselves to the position of the recovering and/or reading head, which fact simplifies the construction of the mechanism for moving the head axially of the discs, because its movements do not now have to be so accurate as is the case for the rigid discs which cannot adjust themselves. Also a very large increase of capacity of the storage device per unit volume is obtained in that the discs are mounted closer together and because they are flexible, they may be considerably thinner than the rigid discs used up until now. Thus the number of discs that can be mounted in a certain length of axis is consequently very considerably increased. For example, in a practically usable and commercial disc storage device, the distance between the centers of two adjacent discs is in the order of five centimeters whereas in the present invention a distance in the order of only two millimeters can be used, that is of about one twenty-fifth of the space.

Since high rotational speeds decrease the pressure between the discs due to centrifugal force, such sub-pressure could cause the rims of the flexible discs to touch each other and hinder the proper operation of the device. This sub-pressure may be counteracted by either mounting the flexible discs of this invention in a space in which a pressure lower than the atmospheric pressure is maintained, or by providing the flexible discs with aligned perforations near their axes so as to create a circulation of such sub-pressure between the discs, or by employing both a sub-pressure and such aligned perforations.

The recording and/or reading head has a slot in which a disc can protrude with the recording and/or reading element proper being positioned inside the end of one side of the slot, and with one or more gas or air supply openings inside the slot opposite to said recording and/or reading element for urging the flexible disc toward said element. These air or gas supply openings may be connected to a duct that can be controllably connected to a source of purified or filtered gas or air having a pressure that is higher than the pressure in the space in which the head and discs are situated. By employing a plurality of such openings instead of just one, the possibility of producing a suction instead of a pressure is avoided, since a suction may occur from just one opening jetting against a fast moving surface.

The above mentioned and other features and objects of this invention and the manner of attaining them will become more apparent and the invention itself will be understood best by reference to the following description of embodiments of the invention taken in connection with the accompaying drawings, wherein.

Figure 1:
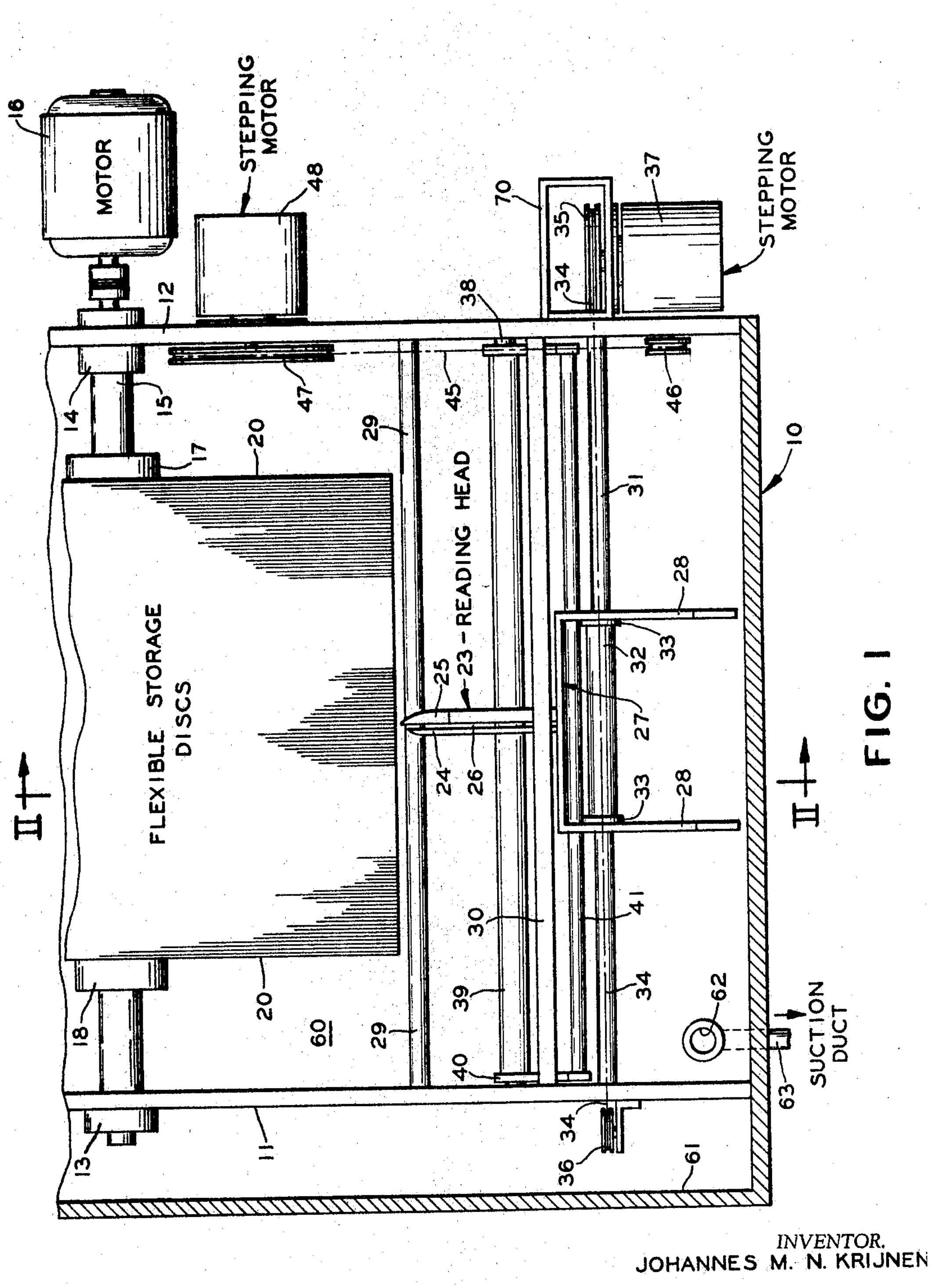
FIG. 1 is a plan view of one embodiment of the present invention with parts broken away to show parts of a plurality of flexible discs, a movable recording and/or reading head, and means for moving said discs and head.
Figure 3:
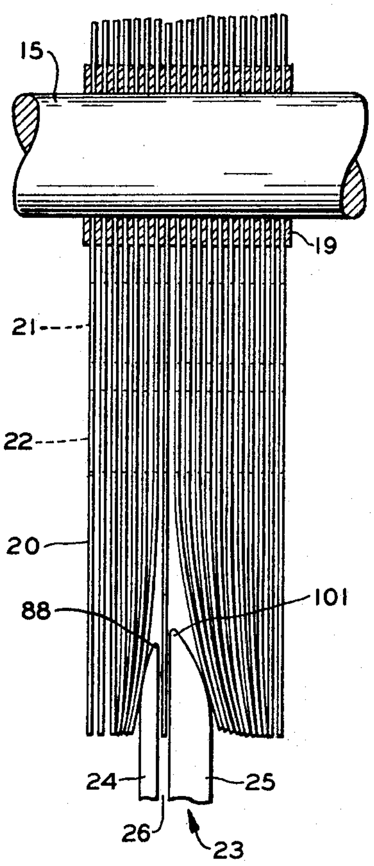
Figures 4, 5:
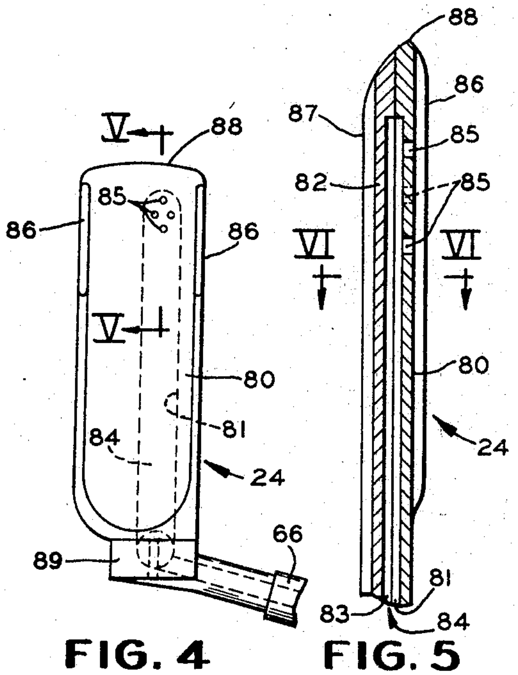
Figure 6:
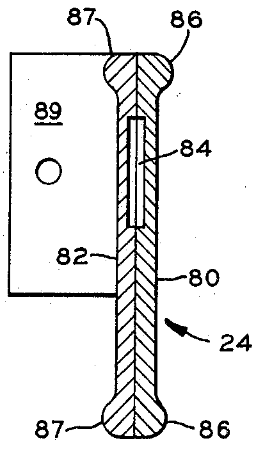
Figures 7, 8:
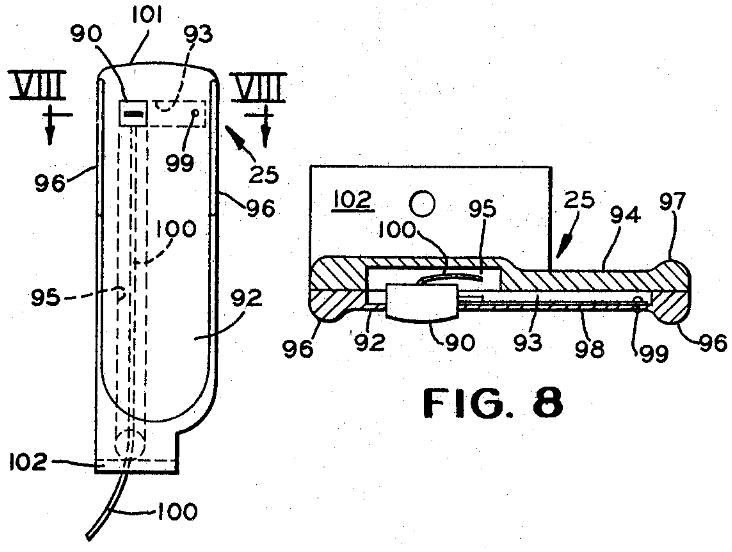
Figure 9:
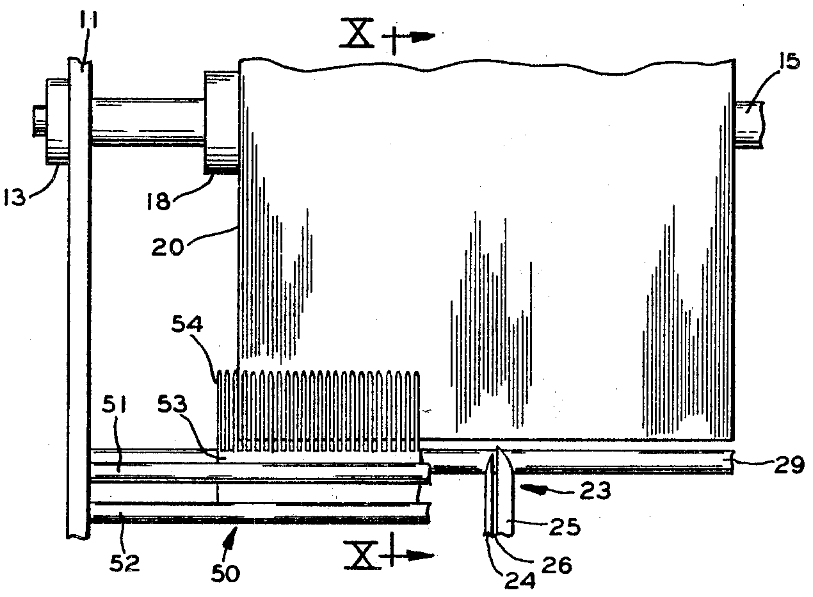
Figure 10:
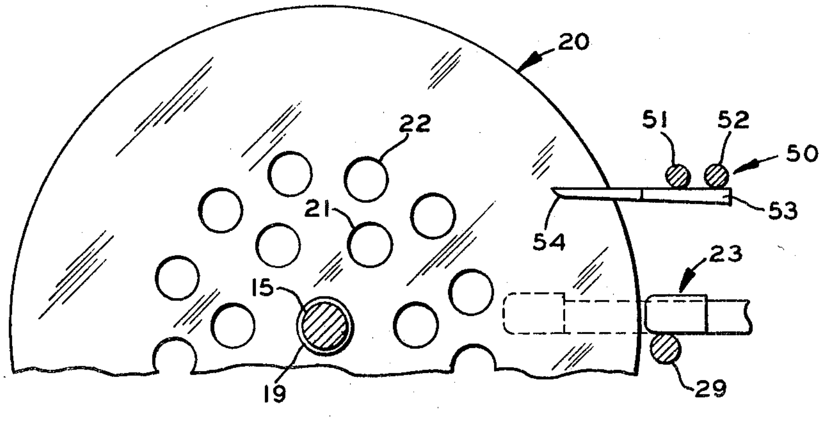

FIG. 1 showing the enclosure around the perforated ·cs and the recording and/or reading head and its ›unting, and in dotted lines showing the recording and/ reading head in its furthest inward radial position;

FIG. 3 is an enlarged schematic plan view of a portion FIG. 1 with parts broken away showing only the read- ; head being inserted among the flexible discs;

FIG. 4 is an enlarged side view of the disc back support the recording and reading head from the inside of the t;

FIG. 5 is a further enlarged sectional view taken along e V—V of FIG. 4 of the end of the disc back support;

FIG. 6 is a sectional view taken along line VI—VI of G. 5 showing the air duct through the disc back sup- rt;

FIG. 7 is an enlarged view similar to FIG. 4 but of the ording and/or reading portion of the head from inside slot;

FIG. 8 is a further enlarged sectional view taken along e VIII—VIII of FIG. 7 showing the position and ›unting of the recording and/or reading elements in the ıd;

FIG. 9 is a partial plan view similar to FIG. 1 showing ›ortion of the disc and recording and/or reading head ;ether with an additional comb plate type lead device the discs; and FIG. 10 is an enlarged sectional view taken along line —X of FIG. 9 showing a portion of a read-out disc l the location of the tooth of the comb plate relative reto and relative to the recording and/or reading head.

FIG. 1 shows an enclosure or vacuum chamber 10 con- ning spaced frame plates 11 and 12 provided with bear- ;s 13 and 14 in which a shaft 15 is journalled, which ıft 15 may be continuously rotated by means of a ›tor 16. On the shaft 15 there are alternately mounted ‹ible discs 20 spaced by spacing rings 19 (FIG. 3), ich discs and rings are clamped together in axial align- ›nt by means of the clamping collars 17 and 18 so as rotate with the shaft 15. A magnetic storage material is ›vided on one or both sides of each of the discs 20 and se discs 20 may be provided with two circular sets of les 21 and 22 (see FIG. 2), which holes 21 and 22 ve the purpose of admitting air into the disc package, ich air is carried away by centrifugal forces exerted by discs 20 which discs generally rotate at a very high ed, such as for instance 1500 revolutions per minute. e diameter and number of holes 21 and 22 depends on the rotational speed, the mutual distance between discs 20, and the sub-pressure of the chamber 10 hin which the device operates. With higher rotational eds a larger decrease in pressure in the chamber 10 is nted and/or larger diameters for the holes 21 and 22. wever, their diameters are limited in view of the me- ınical strength of the discs 20. It has appeared that ›d quiet operation of the discs 20, without aero-dynami- disturbances, is possible with a two millimeter spacing ween the centers of adjacent discs, a disc-package of a hundred discs, rotational speeds for the discs of about )0 revolutions per minute, and a sub-atmospheric pres- e of about two centimeters of a column of mercury. this instance, the holes 21 and 22 were as shown in G. 2, and the discs had a diameter of about 25 centi- ters.

The reading and/or recording head 23 comprises, as o shown in FIG. 3, a disc support or member 24 on one e and a supporting member 25 for the reading and/or ording element proper on the other side, with a slot 26 ween these members. These members 24 and 25 are ›ported by a U-shaped head support 27 having legs 28 e FIG. 1). This head 23 and support 27 can slide to l fro between the rods 29, 30 and 31 mounted between frame plates 11 and 12 and parallel to the shaft 15. d 31 supports a sleeve 32 having flanges 33 engaging insides of the legs 28. An endless wire or tape 34 may attached to the flanges 33 which wire or tape 34 extends about the pulleys 35 and 36 of which the first pulley 35 may be driven by means of a stepping motor 37.

A sleeve 39 (see FIG. 2) is pivotally mounted around rod 38 which rod 38 is fixedly attached to and extends between the frame plates 11 and 12 and also is parallel to the shaft 15. This sleeve 39 has attached to its ends adjacent the frame plates 11 and 12, parallel levers 40 between which levers are connected a driving rod 41. This rod 41 seats into notches or recesses 42 in the legs 28 of the head support 27. One of the lever arms 40 is provided with a slot 43 in which a pin or key 44 can slide and to which key 44 may be attached a second endless wire or tape 45 extending about rotatably mounted pulleys 46 and 47, the latter pulley 47 being coupled to a stepping motor 48.

In FIGS. 9 and 10, a guiding or lead device 50 for the discs 20 is also shown, which consists of two support rods 51 and 52 attached to and between the frame plates 11 and 12 supporting a comb member 53 having teeth 54 such that each disc 20 protrudes into the interspace between two successive or adjacent teeth 54. Although such a guide device 50 is useful in some instances, in other instances it is superfluous, especially when the disc 20 revolves at high speeds.

Figure 2:
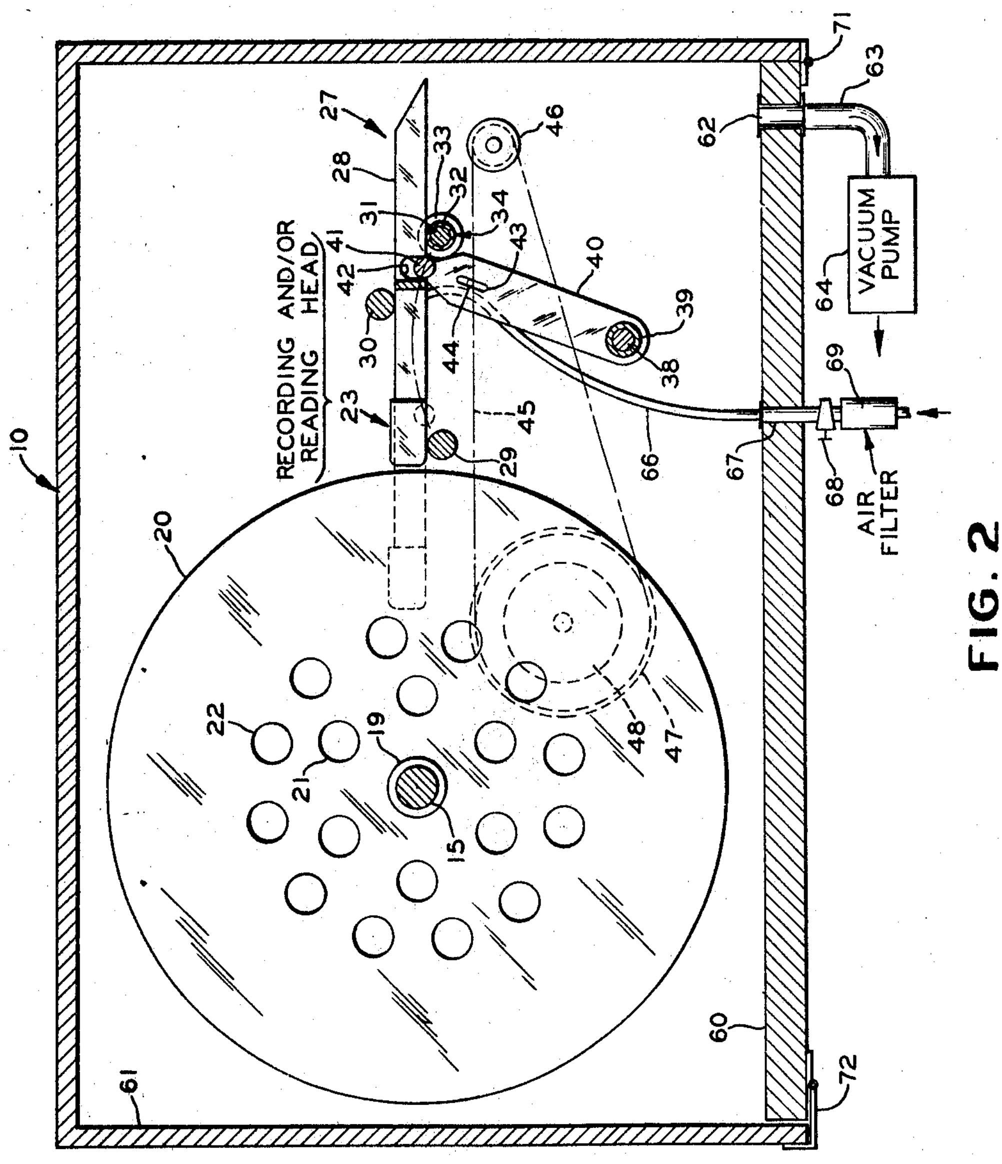
FIG. 2 is a cross-sectional view taken along line II—II

FIGS. 1 and 2 also show the bottom plate 60 that cooperates with a gas-tight cover member 61 to form the chamber 10. The bottom plate 60 is provided with an opening 62 to which is connected a vacuum duct 63 to a suction or vacuum pump 64. A small flexible hose 66 is connected from the reading and/or recording head 23, namely to the back member 24 thereof (see FIG. 4) to a small tube 67 extending through another hole in the bottom plate 60 and having outside thereof a control valve 68 that opens to the ambient atmosphere, preferably through an air filter 69.

Because the discs 20 and the recording and/or reading head 23 are mounted in a space in which a sub-pressure is present, such as for example a technical vacuum consisting of pressure of about two centimeters of a column of mercury, the bearings 13 and 14 are sealed and the pulley 35 is mounted in a sealed box 70 (see FIG. 1) in which instance a sealed connection is employed between the pulley 35 and the motor 37. The cover member 61 may be attached to one side of the bottom plate 60 by hinges 71 and clamped at the opposite side by clamp fasteners 72. The cover member 61 also may have reinforced bends or creases therein in order to resist easier the pressure difference created between the inside of the chamber and the outside atmosphere.

In FIGS. 4 through 8 inclusive, details of the parts 24 and 25 of a preferred embodiment of the recording and/or reading head 23 are shown, which head insures a good positioning of the discs 20 with respect to the recording and/or reading element proper and also reduces the wear of the discs to a minimum.

The disc back support member 24 shown in FIG. 4 is viewed from within the slot 26, and comprises a plate 80 with a recess 81 on the under side thereof, which as shown in FIG. 5 forms a duct 84 with another thin plate 82 having a similar complementary recess 83. It is to this duct 84 that the hose 66 in FIG. 2 is connected, and at the outer end of this duct 84 in the plate 80 are provided a plurality of small holes 85 which exit air toward the opposite side of the disc opposite the recording and/or reading head element. The plate 80 as well as the plate 82 are provided with rounded edge ridges or flanges 86 and 87, respectively, and the outer ends of said plates 80 and 82 taper to a sharpened edge 88 for wedging between adjacent discs 20 as shown in FIG. 3. The inner end of this member 24 may be provided with an apertured flange 89 for connection with the base of the U-shaped support member 27.

The supporting member 25 of the recording and/or reading element 90 is shown in FIG. 7 from inside the slot 26 similar to FIG. 4. This member 25 may also comprise two plates 92 and 94 (see FIG. 8) each being provided with overlapping recesses 93 and 95 and each plate also being provided with rounded edge ridges or flanges 96 and 97, respectively. The recording and/or reading element 90 may be attached by means of a leaf spring 98 to the plate 92 by means such as rivet 99, which spring is mounted in the recess 93. Behind the recording and/or reading element 90 there is provided ample room by the recess 95 in the plate 94 for the electrical conductors 100 to be attached to the element 90 and extend away from the element 90 through the recess (see FIGS. 7 and 8) for connection in the same way as the flexible hose 66 to the head 23 and thence carried through a sealed hole (not shown) in the bottom plate 60. The outer ends of the pair of plates 92 and 94 are also tapered to a sharpened edge 101 for wedging between adjacent discs 20 as shown in FIG. 3 with the additional feature of said edge 101 being spaced from the wedging edge 88 by just the distance between the centers of two adjacent discs so that one and only one disc will just but easily fit in the slot 26 between the members 24 and 25. On the other end of the member 25 is provided an apertured mounting flange 102 similar to flange 89 on member 24, and also for attachment to the base of the U-shaped support member 27. Any suitable or known mounting means may be used for such attachment, such as screwing, bolting, soldering, brazing, spot-welding, and even metal gluing.

The device operates in the following way: When data have to be written in or read out into or from a certain information track on a certain disc 20, the stepping motor 37 is energized until the head 23 is in the right position to cooperate with the chosen disc, after which stepping motor 48 is energized until the recording and/or reading element 90 on the head 23 is positioned opposite to the chosen storage track of the chosen disc. After this the reading and/or writing activity can be carried out. When the reading and/or writing activity is finished, the stepping motor 48 again is energized for withdrawing the head 23 from the package formed by the discs 20, and then the head 23 can again be displaced by energizing the stepping motor 37 toward another disc where it can find another chosen track by again energizing the step motor 48. If desired, the tracks on the discs may be provided with synchronization marks, as is well known in the art.

Although the head 23 described has a reading and/or writing element only on one side thereof, it is within the scope of this invention to mount or provide a reading and/or writing element 90 on both sides of the slot 26 so as to use both sides of the discs 20 for storage areas.

While there is described above the principles of this invention in connection with specific apparatus, it is to be clearly understood that this description is made only by way of example and not as a limitation to the scope of this invention.

What is claimed is:

1. A data storage device, comprising a plurality of closely equally spaced and axially aligned flexible storage discs having fixedly spaced centers, means for rotating said discs around their common axes, said discs containing a plurality of aligned apertures equally spaced around and adjacent said common axis for preventing the reduction of pressure between said discs by centrifugal action, a disc recording and reading head means being wider in its widest part than the thickness of a disc plus twice the spacing between adjacent discs, means for moving said head means axially to a selected one of said discs, and means for moving said head radially into engaging relationship with said selected disc and into deflecting contact with a disc adjacent said selected disc.

2. A device according to claim 1, wherein said head means comprises a slot means, a reading and recording element on one side of said slot means, a back support for said selected disc on the other side of said slot means and provided with a plurality of gas jets directed against the side of said disc directly opposite said recording and reading element.

3. A data storage device, comprising a chamber, means for maintaining a reduced atmosphere in said chamber, a plurality of closely equally spaced and axially aligned flexible storage discs in said chamber, means for rotating said discs around their common axis, a disc recording and reading head means located in said chamber, said head means having a slot for receiving one disc, a reading and recording element on one side of said slot in said head means, a plurality of air jets on the opposite side of said slot and directed towards said reading and recording element, said head means being wider at its widest part than the thickness of a disc plus twice the spacing between adjacent discs, means for moving said head means axially to a selected one of said discs, and means for moving said head means radially to a selected position on said selected disc and into deflecting contact with a disc adjacent said selected disc.

4. A device according to claim 3 including means for varying the amount of air directed through said air jets.

References Cited

UNITED STATES PATENTS

| | | | |
|---|---|---|---|
| 2,265,879 | 12/1941 | Thurm | 179—100.2 |
| 2,293,229 | 8/1942 | Walker | 179—100.2 |
| 2,498,746 | 2/1950 | Walker | 340—174.1 |
| 2,897,484 | 7/1959 | Vogel | 340—174.1 |
| 2,990,182 | 6/1961 | Cailliot | 179—100.2 |
| 2,994,856 | 8/1961 | Dickinson | 340—174.1 |
| 3,105,963 | 10/1963 | Stevens et al. | 340—174.1 |
| 3,130,331 | 4/1964 | Jallen et al. | 340—174.1 |
| 3,130,393 | 4/1964 | Gutterman | 340—174.1 |
| 3,208,056 | 9/1965 | Pearson et al. | 340—174.1 |
| 3,229,269 | 1/1966 | Namenti-Katz | 340—174.1 |
| 3,178,719 | 4/1965 | Shapiro | 340—174.1 |

BERNARD KONICK, Primary Examiner

V. P. CANNEY, Assistant Examiner